US012227015B2

(12) United States Patent
Ogi

(10) Patent No.: US 12,227,015 B2
(45) Date of Patent: Feb. 18, 2025

(54) NAIL PRINTING APPARATUS, NAIL PRINTING METHOD, AND PRINTING APPARATUS

(71) Applicant: CANON KABUSHIKI KAISHA, Tokyo (JP)

(72) Inventor: Kohei Ogi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 377 days.

(21) Appl. No.: 17/677,024

(22) Filed: Feb. 22, 2022

(65) Prior Publication Data

US 2022/0305808 A1 Sep. 29, 2022

(30) Foreign Application Priority Data

Mar. 26, 2021 (JP) ................................ 2021-053232

(51) Int. Cl.
*B41J 3/407* (2006.01)
*A45D 29/22* (2006.01)
*A45D 29/00* (2006.01)

(52) U.S. Cl.
CPC ............ *B41J 3/4073* (2013.01); *A45D 29/22* (2013.01); *A45D 2029/005* (2013.01)

(58) Field of Classification Search
CPC .. B41J 3/4073; B41J 2/04556; B41J 2/04573; B41J 2203/01
See application file for complete search history.

(56) References Cited

U.S. PATENT DOCUMENTS 10,029,477 B2 7/2018 Yamasaki
2001/0017085 A1* 8/2001 Kubo ......................... B41J 2/01 101/35

FOREIGN PATENT DOCUMENTS

CN 106901484 A * 6/2017 ............. A45D 29/00
EP 3546235 A1 * 10/2019 ........... B29C 64/112
JP 2016-116597 A 6/2016

OTHER PUBLICATIONS

Nagao, Machine TranslationofCN-106901484-A, 2017 (Year: 2017).*

* cited by examiner

*Primary Examiner* — Scott A Richmond
(74) *Attorney, Agent, or Firm* — VENABLE LLP

(57) ABSTRACT

A technique capable of correcting the inclination of a light in the height direction to suppress deterioration in the printing quality is to be provided. Regarding a detecting unit capable of detecting a placed nail portion by use of a light whose distance in a predetermined direction is maintained to a predetermined distance, a correction value for correcting the deviation of the nail portion from a position corresponding to the predetermined distance in the predetermined direction, which is caused by the inclination of the light, is obtained. Further, based on a result of the detection by the detecting unit and the correction value, a condition for printing performed by a printing unit on the nail portion is adjusted for printing.

20 Claims, 12 Drawing Sheets

NAIL PRINTING APPARATUS, NAIL PRINTING METHOD, AND PRINTING APPARATUS

BACKGROUND OF THE INVENTION

Field of the Invention

The present invention relates to a nail printing apparatus, a nail printing method, and a printing apparatus capable of printing a desired image on a nail.

Description of the Related Art

Japanese Patent Laid-Open No. 2016-116597 discloses a nail printing apparatus including a raise/lower mechanism, which is capable of being raised and lowered between a standby position where a finger having a nail to be a printing target can be inserted and removed and a position where drawing can be performed on the nail and is configured to move the inserted finger to the position on which the drawing can be performed by use of the raise/lower mechanism. Specifically, at a position corresponding to the position where the drawing can be performed, there is a configuration including a holding member that holds the finger which is raised by the raise/lower mechanism, so that the raised finger is pushed to this holding member.

However, the technique disclosed in Japanese Patent Laid-Open No. 2016-116597 has a configuration in which the finger raised by the raise/lower mechanism is pushed to the holding member so that the finger is fixed at the printing position. For this reason, there is a possibility that the person to be printed on the nail feels pressure or pain on the finger at the time of fixing the finger at the printing position, and thus it is desired to propose an alternative method for raising the finger to an appropriate height position.

For example, as one of such alternative methods, a method of detecting a finger raised by the raise/lower mechanism by use of a straight light such as a laser can be considered.

However, in a case of using a straight light, that is a risk that the optical axis of the straight light is inclined in the height direction due to the tolerance in attaching the member that generates the straight light. For this reason, there has been a risk that the object cannot be detected at an accurate height position and thus printing cannot be properly performed, which causes deterioration in the printing quality.

SUMMARY OF THE INVENTION

The present invention has been made in view of the above-mentioned problems, so as to provide a technique capable of correcting the inclination of a light in the height direction to suppress deterioration in the printing quality.

In the first aspect of the present invention, there is provided a nail printing apparatus including:

- a printing unit configured to be capable of performing printing on a nail portion to be a printing target while relatively changing its position from the nail portion in a first direction;
- a placement unit on which a finger, which includes the nail portion, is placed along a second direction that intersects the first direction;
- a detecting unit configured to detect the nail portion by use of a light whose distance from the printing unit in a third direction, which intersects the first direction and the second direction, is maintained to a predetermined direction;
- a print-controlling unit configured to cause the detecting unit to detect the nail portion of the finger placed on the placement unit by changing a relative position of the placement unit from the light and cause the printing unit to perform printing on the nail portion by changing relative positions of the printing unit and the placement unit so that the nail portion is located away from the printing unit in the third direction by the predetermined distance, based on a result of the detection; and
- an obtaining unit configured to obtain a correction value for correcting deviation of the nail portion from a position corresponding to the predetermined distance to the printing unit in the third direction, the deviation being caused by inclination of an optical axis of the light,
- wherein, based on the correction value, the print-controlling unit adjusts a condition for printing on the nail portion with the printing unit to perform printing.

In the second aspect of the present invention, there is provided a nail printing method for a nail printing apparatus including

- a printing unit configured to be capable of performing printing on a nail portion to be a printing target while relatively changing its position from the nail portion in a first direction,
- a placement unit on which a finger, which includes the nail portion, is placed along a second direction that intersects the first direction, and
- a detecting unit configured to detect the nail portion by use of a light whose distance from the printing unit in a third direction, which intersects the first direction and the second direction, is maintained to a predetermined direction, the nail printing method including:
- a detecting step for causing the detecting unit to detect the nail portion of the finger placed on the placement unit by changing a relative position of the placement unit from the light;
- an obtaining step for obtaining a correction value for correcting deviation of the nail portion from a position corresponding to the predetermined distance to the printing unit in the third direction, the deviation being caused by inclination of an optical axis of the light; and
- a printing step for causing the printing unit to perform printing on the nail portion by changing relative positions of the printing unit and the placement unit so that the nail portion is located away from the printing unit in the third direction by the predetermined distance and by adjusting a condition for printing on the nail portion with the printing unit, based on the correction value.

In the third aspect of the present invention, there is provided a printing apparatus including:

- a printing unit configured to be capable of performing printing on a printing target while relatively changing its position from the printing target in a first direction;
- a detecting unit configured to be capable of detecting the printing target by use of a light whose distance from the printing unit in a second direction, which intersects the first direction, is maintained to a predetermined direction;
- a print-controlling unit configured to cause the detecting unit to detect the printing target by changing a relative position of the printing target from the light and cause the printing unit to perform printing on the printing target by changing relative positions of the printing unit and the printing target so that the printing target is located away from the printing unit in the second direction by the predetermined distance, based on a result of the detection; and an obtaining unit configured to obtain a correction value for correcting deviation of the printing target from a position corresponding to the predetermined distance to the printing unit in the second direction, the deviation being caused by inclination of an optical axis of the light, wherein, based on the correction value, the print-controlling unit adjusts a condition for printing on the printing target with the printing unit to perform printing.

According to the present invention, the inclination of a light in the height direction (the third direction) can be corrected to suppress deterioration in the printing quality.

Further features of the present invention will become apparent from the following description of exemplary embodiments with reference to the attached drawings.

DESCRIPTION OF THE EMBODIMENTS

Hereinafter, with reference to the accompanying drawings, a detailed explanation will be given of an example of an embodiment of a nail printing apparatus, a nail printing method, and a printing apparatus. Note that the following embodiments do not limit the present invention, and every combination of the characteristics explained in the embodiment is not necessarily essential to the solutions in the invention. Further, the relative positions, shapes, etc., of the configurations described in the embodiment are merely examples and do not limit the present invention to the range of the example. Note that, although a nail printing apparatus that performs printing on a human nail is explained in the present specification, the printing target of the present invention is not limited to a human nail. Specifically, application is possible to a variety of printing apparatuses capable of adjusting a printing portion, which performs printing, and a printing target to have a predetermined distance, such as a distance suitable for printing.

<Printing System>

Figure 1:
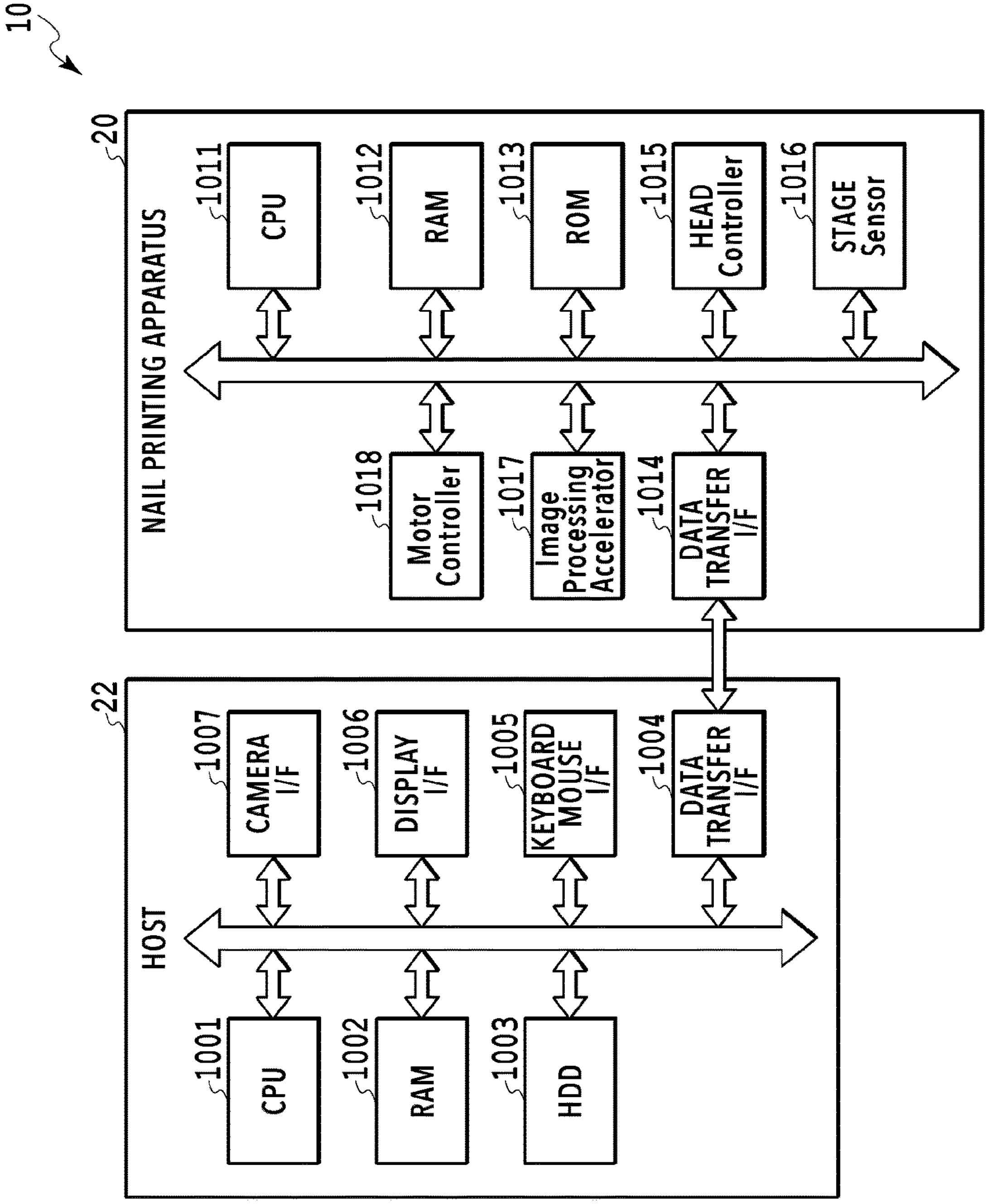
FIG. 1 is a schematic configuration diagram of a printing system including a printing apparatus according to an embodiment.

The nail printing apparatus according to the present embodiment configures a printing system together with a connected host. FIG. 1 is a block configuration diagram of the printing system including the nail printing apparatus of the embodiment. This printing system 10 includes the nail printing apparatus 20 and the host 22 which is configured with a personal computer or the like.

=Host=

The host 22 includes the CPU 1001, the RAM 1002, and the HDD 1003. The CPU 1001 executes processing according to programs which are held in the HDD 1003 and the RAM 1002. The RAM 1002 is a volatile storage, which temporarily saves a program and data. The HDD 1003 is a non-volatile storage, which saves a program and data.

The host 22 includes the DATA TRANSFER I/F (data transfer interface) 1004. The DATA TRANSFER I/F 1004 controls transmission and reception of data to and from the nail printing apparatus 20. As the connection method for this transmission and reception of data, a wired connection such as USB, IEEE1394, or LAN, or a wireless connection such as Bluetooth (registered trademark) or Wi-Fi (registered trademark) can be used.

The host 22 includes the KEY BOARD MOUSE I/F (keyboard-mouse interface) 1005. The KEY BOARD MOUSE I/F 1005 is an I/F that controls an HID (Human Interface Device) such as a keyboard and mouse. The user can perform an input operation via this KEY BOARD MOUSE I/F 1005.

The host 22 includes the DISPLAY I/F (display interface) 1006 and the CAMERA I/F (camera interface) 1007. The display I/F 1006 controls displaying on a display device (not illustrated in the drawings). The CAMERA I/F 1007 is connected to the image-capturing portion 204 (which will be described later) installed in the nail printing apparatus 20, and an image that is captured by the image-capturing portion 204 is input to the host 22 via the CAMERA I/F 1007.

=Nail Printing Apparatus=

The nail printing apparatus 20 includes the CPU 1011, the RAM 1012, and the ROM 1013. The CPU 1011 executes various processing including the processing of obtaining a correction value and the printing processing, which will be described later, according to programs which are held in the ROM 1013 or the RAM 1012. The RAM 1012 is a volatile storage, which temporarily holds a program and data. The ROM 1013 is a non-volatile storage, which holds table data and a program to be used in various processing.

The nail printing apparatus 20 includes the DATA TRANSFER I/F (data transfer interface) 1014 and the HEAD Controller (head controller) 1015. The DATA TRANSFER I/F 1014 controls the transmission and reception of data to and from the host 22. The HEAD Controller 1015 controls ejection of ink by outputting a signal based on print data to the print head 2030 (which will be described later). Specifically, the HEAD Controller 1015 has a configuration capable of reading a control parameter and print data from a predetermined address of the RAM 1012. If the CPU 1011 writes a control parameter and print data to a predetermined address of the RAM 1012, the print head 2030 is controlled by the HEAD Controller 1015, based on the information written to the predetermined address.

The nail printing apparatus 20 includes the STAGE Sensor (stage sensor) 1016 and the MOTOR Controller (motor controller) 1018. The STAGE Sensor 1016 obtains information related to the height position of the finger raise/lower portion (which will be described later) and transmits the information to the CPU 1011. The MOTOR Controller 1018 controls driving of various motors (not illustrated in the drawings). For example, these motors are used for moving the printing portion 203 (not illustrated in the drawings), which includes the print head 2030, moving the hand placement portion 205 (which will be described later), and the like.

The nail printing apparatus 20 includes the Image Processing Accelerator (image processing accelerator) 1017. The Image Processing Accelerator 1017 is configured with hardware so as to be capable of executing image processing at a higher speed than the CPU 1011. Specifically, the Image Processing Accelerator 1017 can read a parameter and data that are necessary for the image processing from a predetermined address of the RAM 1012. If the CPU 1011 writes the above-mentioned parameter and data to the RAM 1012, the Image Processing Accelerator 1017 is launched so that predetermined image processing is executed. Note that the Image Processing Accelerator 1017 is not necessarily a required configuration. Depending on the specifications of the nail printing apparatus 20, it is also possible to execute the image processing and processing of creating a table parameter, based on the above-mentioned parameter, only with the processing performed by the CPU 1011.

<Nail Printing Apparatus>

Figure 2:
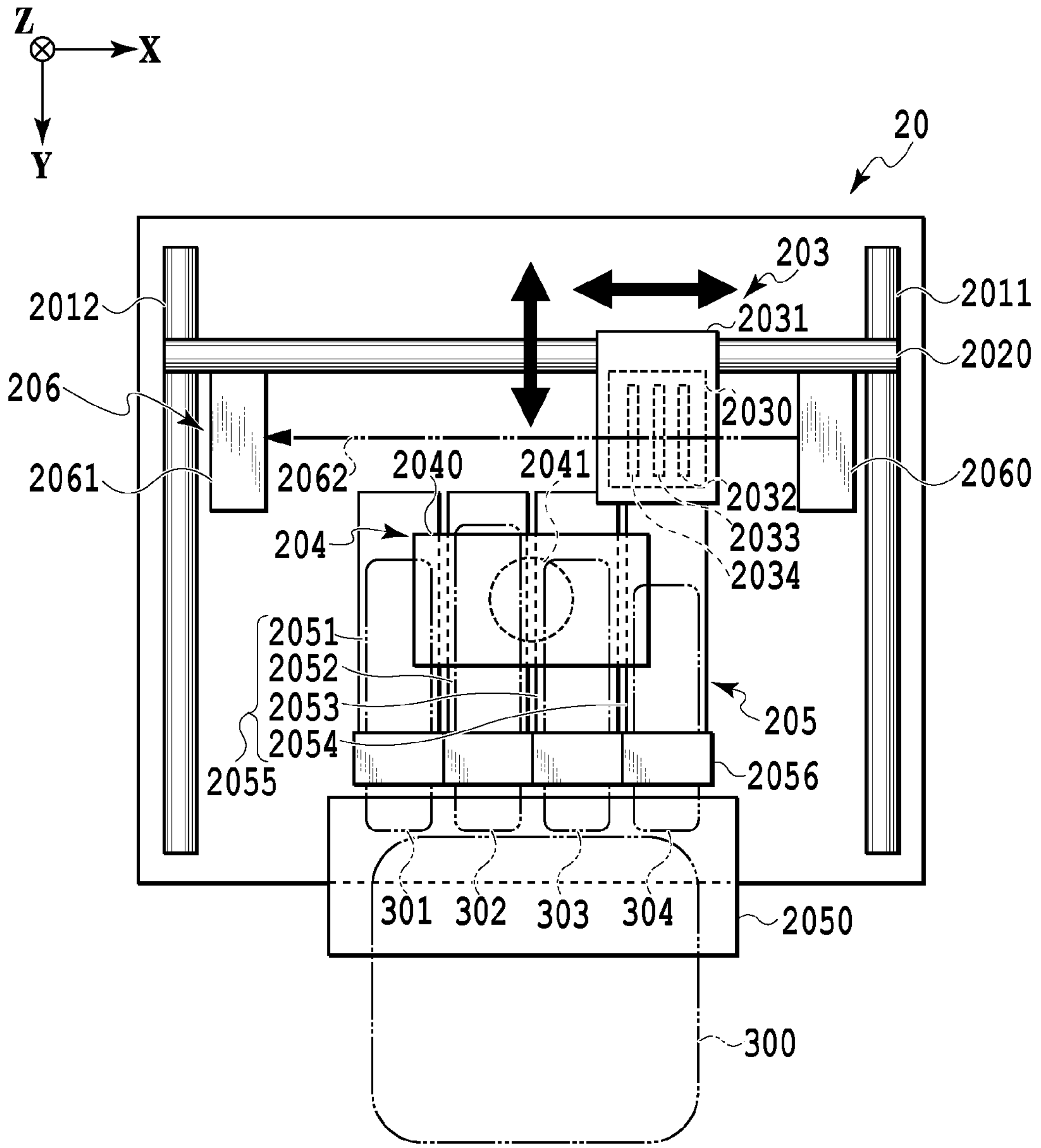
FIG. 2 is a planar view illustrating a schematic configuration of the printing apparatus according to the embodiment.
Figure 3:
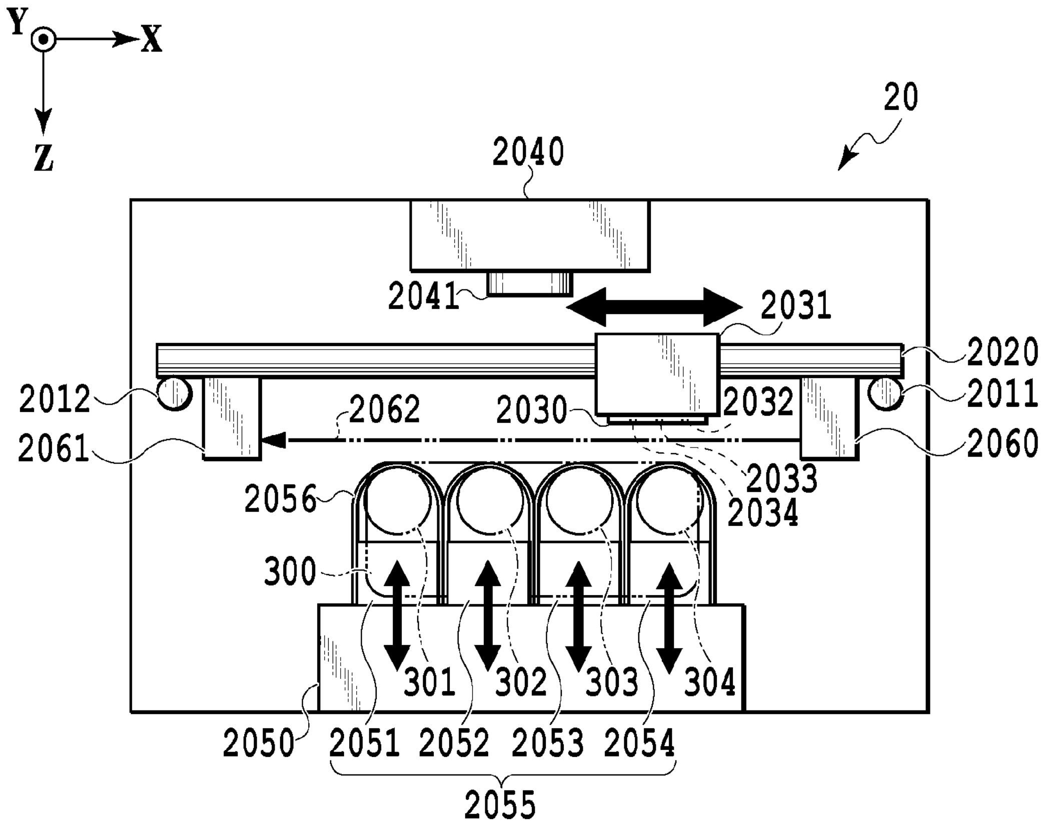
FIG. 3 is a front view illustrating the schematic configuration of the printing apparatus of FIG. 2.
Figure 4:
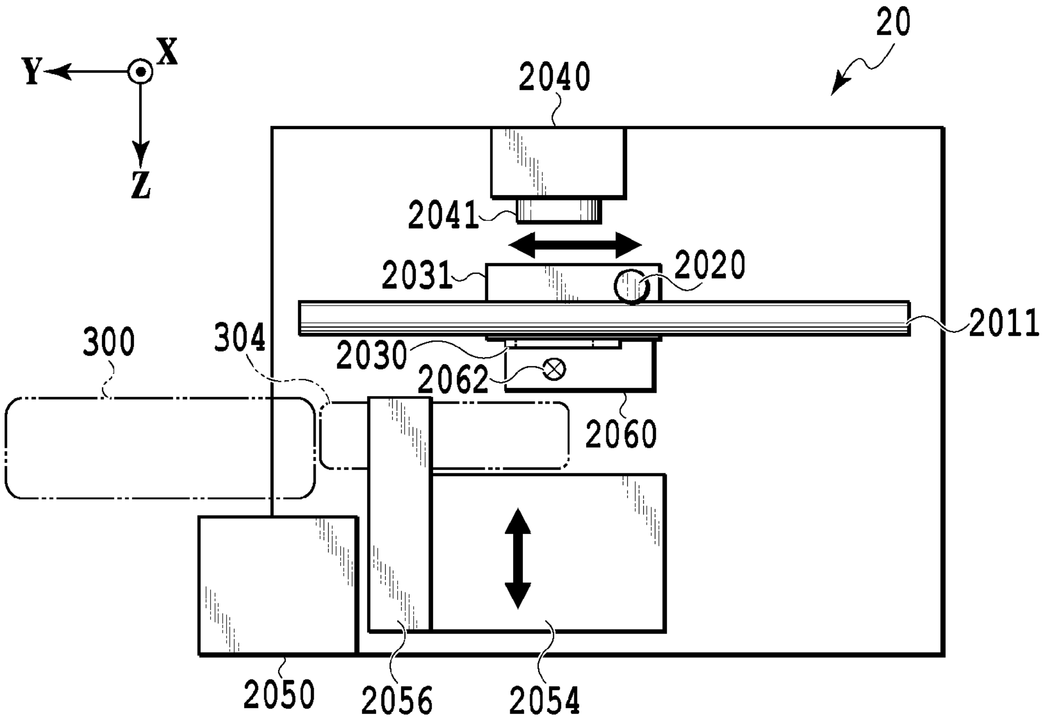
FIG. 4 is a right side view illustrating the schematic configuration of the printing apparatus of FIG. 2.

FIG. 2 is a planar view illustrating a schematic configuration of the nail printing apparatus according to the embodiment. FIG. 3 is a front view of the nail printing apparatus of FIG. 2. FIG. 4 is a right side view of the nail printing apparatus of FIG. 2. The nail printing apparatus 20 according to the embodiment includes the printing portion 203 that ejects ink to a nail (also appropriately referred to as a "nail portion" in the present specification), which is a printing target, by an inkjet system. Further, the nail printing apparatus 20 includes the hand placement portion 205 for placing a hand on which a nail to be a printing target is formed. Note that the printing portion 203 and the hand placement portion 205 are configured so that their relative positions can be changed in the X direction and the Y direction which intersects the X direction (orthogonally in the present embodiment).

The nail printing apparatus 20 includes the image-capturing portion 204 for obtaining the position and shape of the nail on a finger of the hand placed on the hand placement portion 205 in the X and Y directions. Further, the nail printing apparatus 20 includes the laser portion 206 for detecting the position of the nail on a finger of the hand placed on the hand placement portion 205 in the Z direction which intersects the X direction and the Y direction (orthogonally in the present embodiment).

<Printing Portion>

The printing portion 203 includes the carriage 2031 which is movable in the X direction and the print head 2030 which is detachable from the carriage 2031. The print head 2030 is formed with the nozzle array 2032 for ejecting cyan (C) ink, the nozzle array 2033 for ejecting magenta (M) ink, and the nozzle array 2034 for ejecting yellow (Y) ink. Each of these nozzle arrays is formed by arranging multiple nozzles for ejecting the corresponding ink along the Y direction. Further, if the print head 2030 is mounted on the carriage 2031, the respective nozzle arrays are arranged in the order of the nozzle array 2032, the nozzle array 2033, and the nozzle array 2034 toward the —X direction. Ink is supplied to the print head 2030 from an ink tank (not illustrated in the drawings) which is installed in the nail printing apparatus 20, and the supplied ink is ejected from the nozzles of the corresponding nozzle array. The respective nozzle arrays are formed on the same plane.

The carriage 2031 is installed so as to be movable in the X and Y directions relative to the hand placement portion 205. Therefore, the print head 2030 which is mounted on the carriage 2031 is installed so as to be movable in the X and Y directions relative to the hand placement portion 205 because of the carriage 2031. Specifically, in the present embodiment, the carriage 2031 is installed so as to be movable on the X rail guide 2020 which extends in the X direction. This X rail guide 2020 is installed so as to be movable on the pair of Y rail guides 2011 and 2012 which extend in the Y direction. The carriage 2031 is capable of reciprocating in the +X direction and the —X direction along the X rail guide 2020 by use of a motor (not illustrated in the drawings). Further, the X rail guide 2020 is capable of reciprocating in the +Y direction and the —Y direction along the pair of Y rail guides 2011 and 2012 by use of a motor (not illustrated in the drawings).

For example, the movable range of the carriage 2031 in the X direction is at least a range in which printing can be performed on the nails of the fingers that are placed on the hand placement portion 205 located at the printing preparation position (which will be described later). Further, for example, the movable range of the carriage 2031 in the Y direction is a range that includes a position at which printing can be performed on the nails of the fingers that are placed on the hand placement portion 205 located at the printing preparation position and includes a position which does not overlap the hand placement portion 205 located at the printing preparation position with respect to the Y direction.

Although the carriage 2031 (the print head 2030) is configured to be movable in the X direction and the Y direction relative to the hand placement portion 205 as described above in the present embodiment, there is not a limitation as such. That is, it is sufficient as long as the relative positions of the printing portion 203 and the hand placement portion 205 can be changed in the X direction and the Y direction, and the mechanism of moving the printing portion 203 relative to the hand placement portion 205 is not limited to the configuration explained above.

For performing printing on a nail to be a printing target, the printing operation of ejecting ink to the nail while moving the print head 2030 in the X direction (the first direction) to print an image of one scan is performed. Thereafter, the moving operation of moving the print head 2030 in the Y direction by a predetermined amount corresponding to the printing of one scan is performed, and then the printing operation is performed again. In this way, the nail printing apparatus 20 prints an image on a nail to be a printing target by alternately and repeatedly executing the printing operation and the moving operation.

<Image-Capturing Portion>

The image-capturing portion 204 is arranged at a position capable of capturing the image of a nail on a finger placed on the hand placement portion 205 located at the printing preparation position. In the present embodiment, the camera 2040 is arranged on the —Z direction side, that is, on the upper side, relative to the hand placement portion 205 at the printing preparation position. This camera 2040 is configured to capture the image of a nail through the image-capturing lens 2041. In a case where a right hand is placed on the hand placement portion 205, the center of the image captured by the camera 2040 is, for example, between the middle finger and the ring finger with respect to the X direction and at a position corresponding to the nail portions of the index finger and the ring finger with respect to the Y direction (see FIG. 2). Note that, for example, information of the image captured by the camera 2040 is output to the host 22, and the host 22 performs image processing to obtain information related to the positions and shapes of the nail portions in the captured image.

<Hand Placement Portion>

The hand placement portion 205 is located on the +Z direction side, that is, on the lower side, relative to the printing portion 203 and is arranged on the floor side of the nail printing apparatus 20 in the present embodiment. The hand placement portion 205 includes the palm placement portion 2050 for placing a palm and the four finger raise/lower portions 2051, 2052, 2053, and 2054 on which fingers are placed and capable of raising and lowering the placed fingers (movable in the Z direction). In the present embodiment, the finger raise/lower portions 2051 to 2054 function as a placing part on which a nail portion to be a printing target is placed.

Each finger raise/lower portion is configured so that one finger, on which a nail portion to be a printing target is formed, can be placed. Note that, although the finger raise/lower portions 2051 to 2054 of the hand placement portion 205 are configured to be movable in the Z direction in the present embodiment, there is not a limitation as such. That is, it is sufficient as long as the finger raise/lower portions 2051 to 2054 and the printing portion 203 are configured to be capable of changing their relative positions, and the mechanism of moving the finger raise/lower portions 2051 to 2054 relative to the printing portion 203 is not limited to the configuration explained above. For example, it is also possible that the printing portion 203 and the laser portion 206 are configured to be movable in the Z direction relative to the finger raise/lower portion 2055. Alternatively, it is also possible that the finger raise/lower portion 2055 as well as the printing portion 203 and the laser portion 206 are configured to be movable in the Z direction.

Each of the finger raise/lower portions 2051 to 2054 is configured to be independently movable in the Z direction by use of a motor (not illustrated in the drawings). Note that, in FIG. 2 to FIG. 4, the palm and fingers in a case where the right hand of a person to be printed is placed on the hand placement portion 205 are shown by the dashed lines. Therefore, in FIG. 2 to FIG. 4, the index finger 301 is placed on the finger raise/lower portion 2051, the middle finger 302 is placed on the finger raise/lower portion 2052, the ring finger 303 is placed on the finger raise/lower portion 2053, the little finger 304 is placed on the finger raise/lower portion 2054, and the right palm 300 is placed on the palm placement portion 2050. In the present embodiment, for ease of understanding, it is assumed that the four fingers all have the same thickness and have the lengths as follows: middle finger>index finger=ring finger>little finger. Further, it is assumed that the heights (the lengths in the Z direction) and the widths (the lengths in the X direction) of the fingers are the same and the cross sections of the fingers are exact circles.

The hand placement portion 205 is configured to be movable between the printing preparation position in which printing can be performed by the printing portion 203 (see FIG. 2 to FIG. 4) and a hand-placing position, which is not illustrated in the drawings but is a position which is away from the movable area of the printing portion 203 and in which the person to be printed places his or her hand on the hand placement portion 205. For example, relative to the printing preparation position illustrated in the drawings, the hand-placing position is located on the lower side in FIG. 2 and is located on the left side in FIG. 4. Note that, in the following explanation regarding the finger raise/lower portions 2051, 2052, 2053, and 2054, each finger raise/lower portion is collectively referred to as the finger raise/lower portion 2055 in the explanation common to each finger raise/lower portion.

Further, each finger raise/lower portion 2055 includes the finger-fixing part 2056 for fixing the placed finger. Accordingly, the finger placed on the finger raise/lower portion 2055 is held at a certain position on the finger raise/lower portion 2055 even if the finger raise/lower portion 2055 is raised or lowered. Therefore, the finger raise/lower portion 2055 can raise or lower the placed finger along the Z direction while maintaining the placed finger at a predetermined position of the finger raise/lower portion 2055.

<Laser Portion>

The laser portion 206 includes the light emitting portion 2060 that emits a laser light and the light receiving portion 2061 that receives the laser light emitted from the light emitting portion 2060. This laser portion 206 is used for detecting the position of the nail portion of the finger placed on the finger raise/lower portion 2055 in the Z direction. That is, in the present embodiment, the laser portion 206 functions as a detecting portion capable of detecting the nail portion of the finger placed on the finger raise/lower portion 2055.

The light emitting portion 2060 and the light receiving portion 2061 are arranged so that the optical axis 2062 of the laser beam is located on the lower side of the lowermost part (the end part on the +Z direction side) of the printing portion 203, that is, on the lower side of the plane of the print head 2030 where the nozzle arrays are formed. In the present embodiment, the distance between the lowermost part of the printing portion 203, that is, the plane of the print head 2030 where the nozzle arrays are formed, and the optical axis 2062 in the Z direction is equal to or shorter than the distance suitable for printing on a nail portion to be a printing target performed by the printing portion 203. Note that, as the case where the distance in the Z direction between the plane on which the nozzle arrays are formed and the optical axis 2062 matches the above-mentioned distance suitable for printing, there is not limitation to a case where the distances completely match, but a case in which the distances match within a predetermined range is also included. Further, the distance suitable for printing is a distance capable of maintaining a certain level of printing quality or higher if ink is ejected from the nozzle arrays of the printing portion 203 to the printing target for printing.

Further, the light emitting portion 2060 and the light receiving portion 2061 are arranged so that the direction which intersects the direction (the Y direction) in which the finger raise/lower portions 2051 to 2054 extend (in the present embodiment, the orthogonal direction, which is the X direction) is parallel to the optical axis 2062. By setting the laser portion 206, the printing portion 203, and the hand placement portion 205 in the above-mentioned positional relationship, in a case where the finger raise/lower portion 2055 is raised, these fingers 301 to 304 block the optical axis 2062 before making contact with the printing portion 203. By utilizing such a configuration, the possibility of contacting can be detected by the laser portion 206 before the fingers 301 to 304 make contact with the printing portion 203. Further, the position detected by the laser portion 206 is the position corresponding to the distance suitable for printing on the nail portions formed on the raised fingers.

Further, the laser portion 206 is installed so as to be movable in the Y direction relative to the hand placement portion 205. Specifically, the light emitting portion 2060 and the light receiving portion 2061 are fixedly installed on the X rail guide 2020. The light emitting portion 2060 is fixedly arranged in the vicinity of one end part (on the right side in FIG. 2) of the X rail guide 2020, and the light receiving portion 2061 is fixedly arranged in the vicinity of the other end part (on the left side in FIG. 2) of the X rail guide 2020. Note that the arrangement positions of the light emitting portion 2060 and the light receiving portion 2061 on the X rail guide 2020 are outside the movable range of the carriage 2031 which is installed so as to be movable on the X rail guide 2020. Accordingly, the light emitting portion 2060 and the light receiving portion 2061 are configured to be movable in the Y direction by moving the X rail guide 2020 in the Y direction via the Y rail guides 2011 and 2012. Further, the distance between the optical axis 2062 and the printing portion 203 can be maintained at the above-mentioned distance suitable for printing.

In general, the lengths and shapes of fingers and the lengths and shapes of nail portions vary from person to person. Further, even for the same person, the length and shape of a nail portion may differ for each finger. Further, nail portions are not necessarily in a planar shape, and, even in the same nail portion, the position in the height direction may differ depending on the Y direction. Since the laser portion 206 is capable of moving in the Y direction to detect the position of a nail portion, it is possible to detect a suitable height position of a nail portion. Note that it is sufficient as long as the laser portion 206 and the hand placement portion 205 can change their relative positions in the Y direction, and the mechanism of moving the laser portion 206 relative to the hand placement portion 205 is not limited to the configuration explained above.

Further, the laser portion 206 is arranged so that the optical axis 2062 overlaps at least three nozzle arrays 2032 to 2034 in the X direction and the Y direction. Accordingly, the optical axis 2062 is at least located on the lower side relative to the nozzle arrays 2032 to 2034 of the printing portion 203 that moves in the X direction. Therefore, regardless of the position of the carriage 2031, the fingers 301 to 304 can be detected by the laser portion 206 before making contact with the carriage 2031 and the print head 2030. In this way, in the present embodiment, the optical axis 2062 is formed so that the distance from the printing portion 203 in the Z direction (the second direction) is maintained to a predetermined distance, that is, the distance suitable for printing.

<Configuration Related to Height Adjustment>

Figure 5:
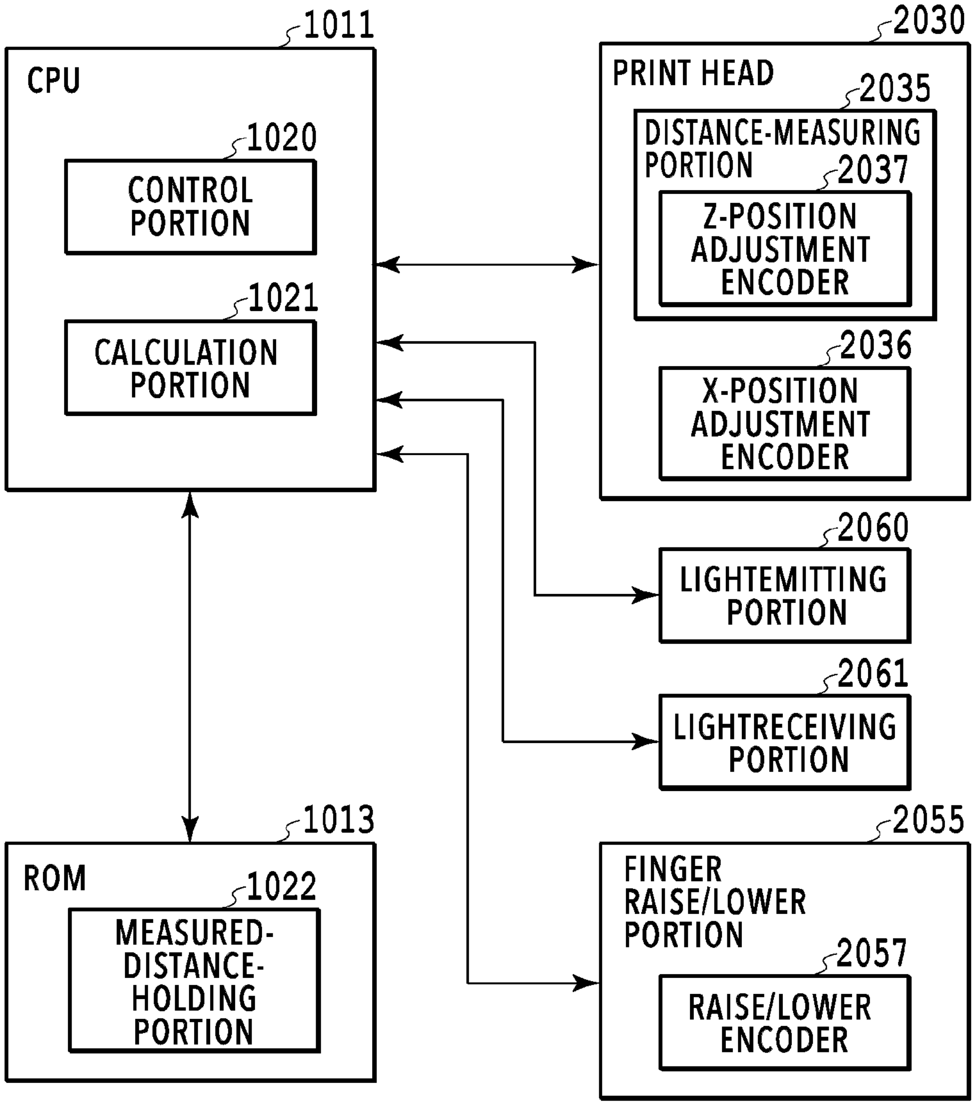
FIG. 5 is a block configuration diagram in which the configuration of a height adjustment function of the printing apparatus of FIG. 1 is centered.
Figure 6:
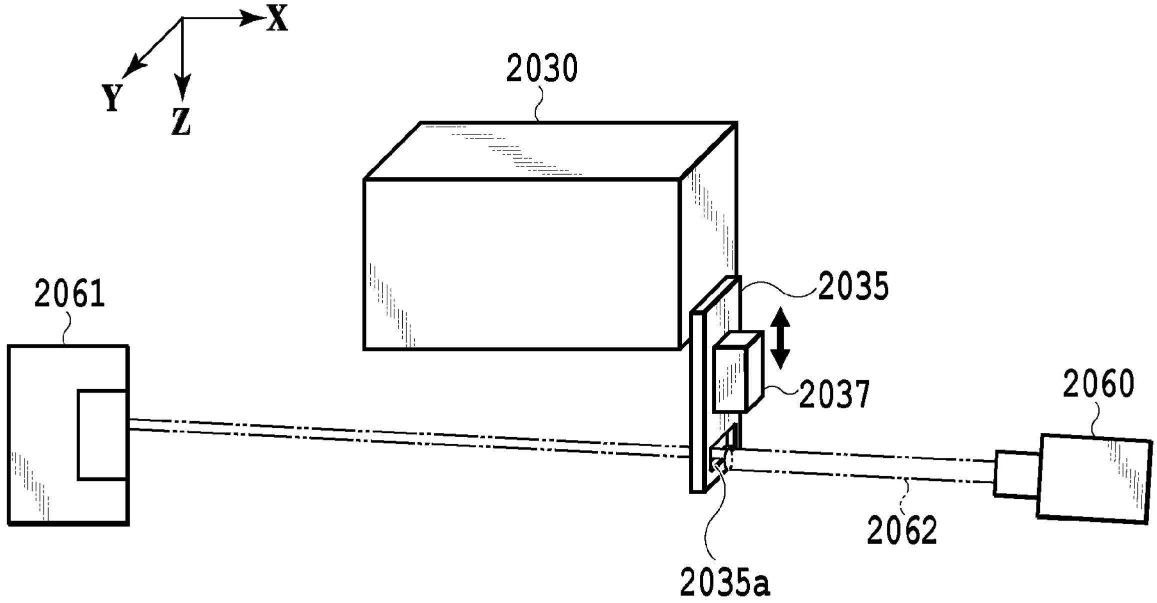
FIG. 6 is a schematic configuration diagram of a distance-measuring portion.

Next, the configuration related to height (the Z direction) adjustment in the nail printing apparatus 20 will be explained. FIG. 5 is a block diagram illustrating the configuration related to the height adjustment of the nail printing apparatus. FIG. 6 is a schematic configuration diagram of a distance-measuring portion.

The CPU 1011 includes the control portion 1020 that controls various configurations and the calculation portion 1021 that calculates the inclination of the optical axis 2062 of the straight light (laser light) from the laser portion 206 and a correction value based on the inclination. The ROM 1013 includes the measured-distance-holding portion 1022 that holds the distance between the print head 2030 and the optical axis 2062, which is measured by the later-described distance-measuring portion 2035.

The print head 2030 includes the distance-measuring portion 2035 which is capable of measuring the distance between the print head 2030 and the optical axis 2062 of the laser beam emitted from the light emitting portion 2060 toward the light receiving portion 2061. Further, the print head 2030 includes the X-position adjustment encoder 2036, and the CPU 1011 adjusts the position of the print head 2030 in the X direction, based on the output from this X-position adjustment encoder 2036.

The distance-measuring portion 2035 is installed so as to be capable of being raised and lowered in the print head 2030 and installed at a position that intersects the optical axis 2062 of the laser light from the laser portion 206 by lowering in a case where the print head 2030 is mounted on the carriage 2031 (see FIG. 6). The distance-measuring portion 2035 is formed in an approximately plate shape with a material that blocks the laser light, and the transmission portion **2035*a* through which the laser light from the laser portion 206 can be transmitted is formed on the lower side thereof. Note that the transmission portion 2035*a* may be configured with a material capable of transmitting the laser light or may be simply in an aperture shape. The distance-measuring portion 2035 is configured to be raised and lowered, that is, configured to move in the Z direction under the control by the control portion 1020. Further, the distance-measuring portion 2035 includes the Z-position adjustment encoder 2037, and the control portion 1020 adjusts the position of the distance-measuring portion 2035 in the Z direction, based on the output from this Z-position adjustment encoder 2037**.

The light emitting portion 2060 emits a laser light under the control by the CPU 1011. The light receiving portion 2061 receives the laser light emitted from the light emitting portion 2060 and outputs an analog signal indicating the light receiving level to the CPU 1011. Further, each finger raise/lower portion 2055 includes the raise/lower encoder 2057. The CPU 1011 adjusts the position of the finger raise/lower portion 2055 in the Z direction, that is, the raised/lowered amount, based on the output from this raise/lower encoder 2057. For example, in a case where the later-described correction value based on the inclination of the optical axis 2062 is a value indicating the distance to be raised or lowered, the CPU 1011 moves the finger raise/lower portion by the distance corresponding to the correction value while calculating the movement distance based on an encoder pulse which is output from the raise/lower encoder 2057.

<Correction Value Obtainment Processing>

Next, the processing of obtaining a correction value for correcting deviation which is caused by inclination of the optical axis 2062 will be explained. In the case of a configuration in which the position of an object is detected based on the amount of received laser light, there is a risk that the optical axis of the laser light that must be formed along the X direction is inclined due to the tolerance in attaching a member that generates the laser light.

In the present embodiment, the position in the Z direction of a nail portion to be a printing target is detected by the amount of received laser light. More specifically, in the nail printing apparatus 20, as explained in the later-described nail printing processing, the nail portion to be the printing target is detected by the optical axis 2062 that is located at a distance suitable for printing with the printing portion 203, and the raised amount of the finger raise/lower portion 2055 at that time is stored. Further, at the time of printing, by raising the finger raise/lower portion 2055 based on the stored raised amount, the nail portion is raised to the position corresponding to the distance suitable for printing with the printing portion 203, regardless of the shapes of the finger and nail that vary from person to person.

Figure 7A:
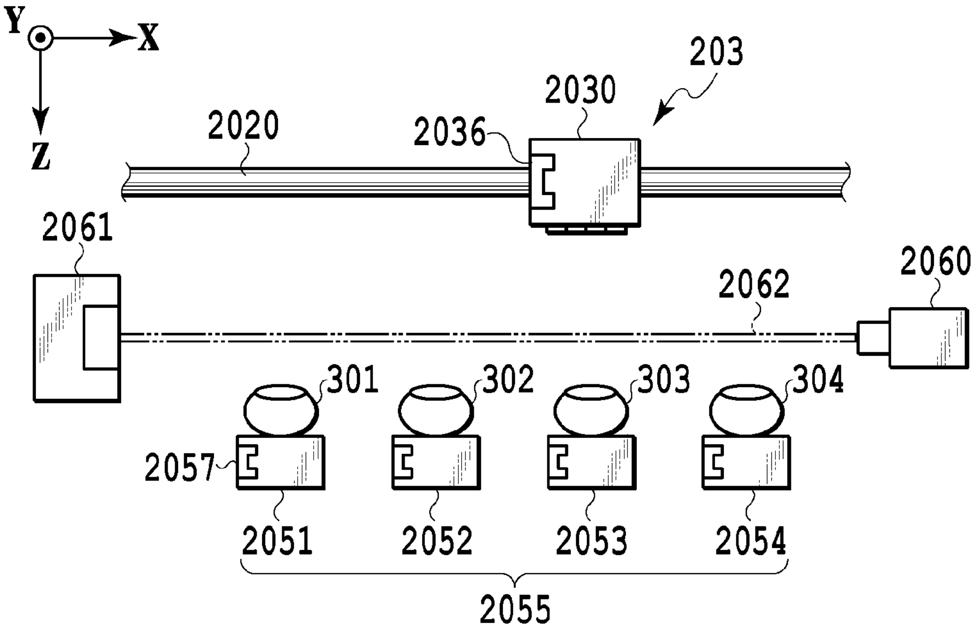
FIG. 7A and FIG. 7B are diagrams for explaining inclination of an optical axis.
Figure 7B:
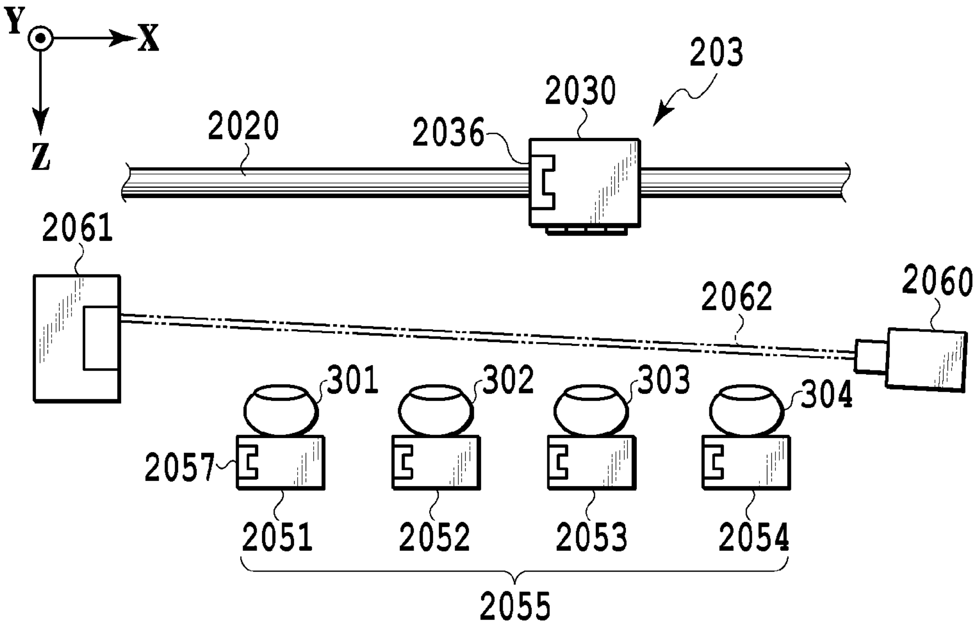

Therefore, as illustrated in FIG. 7A and FIG. 7B, if the optical axis of the laser beam is inclined in the Z direction, the nail portion cannot be located at the position corresponding to the distance suitable for printing. In the following explanation, the "position corresponding to the distance suitable for printing (with the printing portion 203)" is appropriately referred to as the "position suitable for printing". Further, in the present specification, "the optical axis is inclined in the Z direction" represents that the optical axis 2062 is inclined in the Z direction relative to the XY plane. FIG. 7A and FIG. 7B are diagrams for explaining the inclination of the optical axis in the Z direction. FIG. 7A is a diagram illustrating a case in which the optical axis is not inclined in the Z direction, and FIG. 7B is a diagram illustrating a case in which the optical axis is inclined in the Z direction.

More specifically, in a case where the optical axis 2062 is not inclined in the Z direction as in FIG. 7A, that is, in a case where the optical axis 2062 is on the XY plane, the distances between the printing portion 203 and the optical axis 2062 on the upper side of the finger raise/lower portions 2051 to 2054 are the same. The distance between the optical axis 2062 and the printing portion 203 matches the distance between the printing target and the printing portion 203 that is suitable for printing. Therefore, by raising the nail portion of a finger placed on the finger raise/lower portion 2055 to a position where the nail portion makes contact with the optical axis 2062, the nail portion can be located at a position suitable for printing by the printing portion 203.

On the other hand, in a case where the optical axis 2062 is inclined in the Z direction as in FIG. 7B, the distances between the printing portion 203 and the optical axis 2062 on the upper side of the respective finger raise/lower portions 2051 to 2054 are different. Therefore, if the nail portion of a finger placed on the finger raise/lower portion 2055 is raised to a position where the nail portion makes contact with the optical axis 2062, the nail portion is deviated more toward the upper side from the position suitable for printing as the nail portion is further distant from the light emitting portion 2060 in the X direction, and thus the nail portion cannot be located at a position suitable for printing. Therefore, there is a risk that the printing quality is deteriorated in the printing on the nail portion.

Therefore, in the present embodiment, the distance-measuring portion 2035 installed on the print head 2030 is used to obtain the inclination of the optical axis 2062 in the Z direction, in order to calculate the correction value for correcting the deviation in the position suitable for printing on the nail portion, which is caused by the inclination. Further, based on the calculated correction value, the raised amount of the finger raise/lower portion 2055, which is a condition for printing on the nail portion of the finger placed on the finger raise/lower portion 2055, is adjusted.

Figure 8:
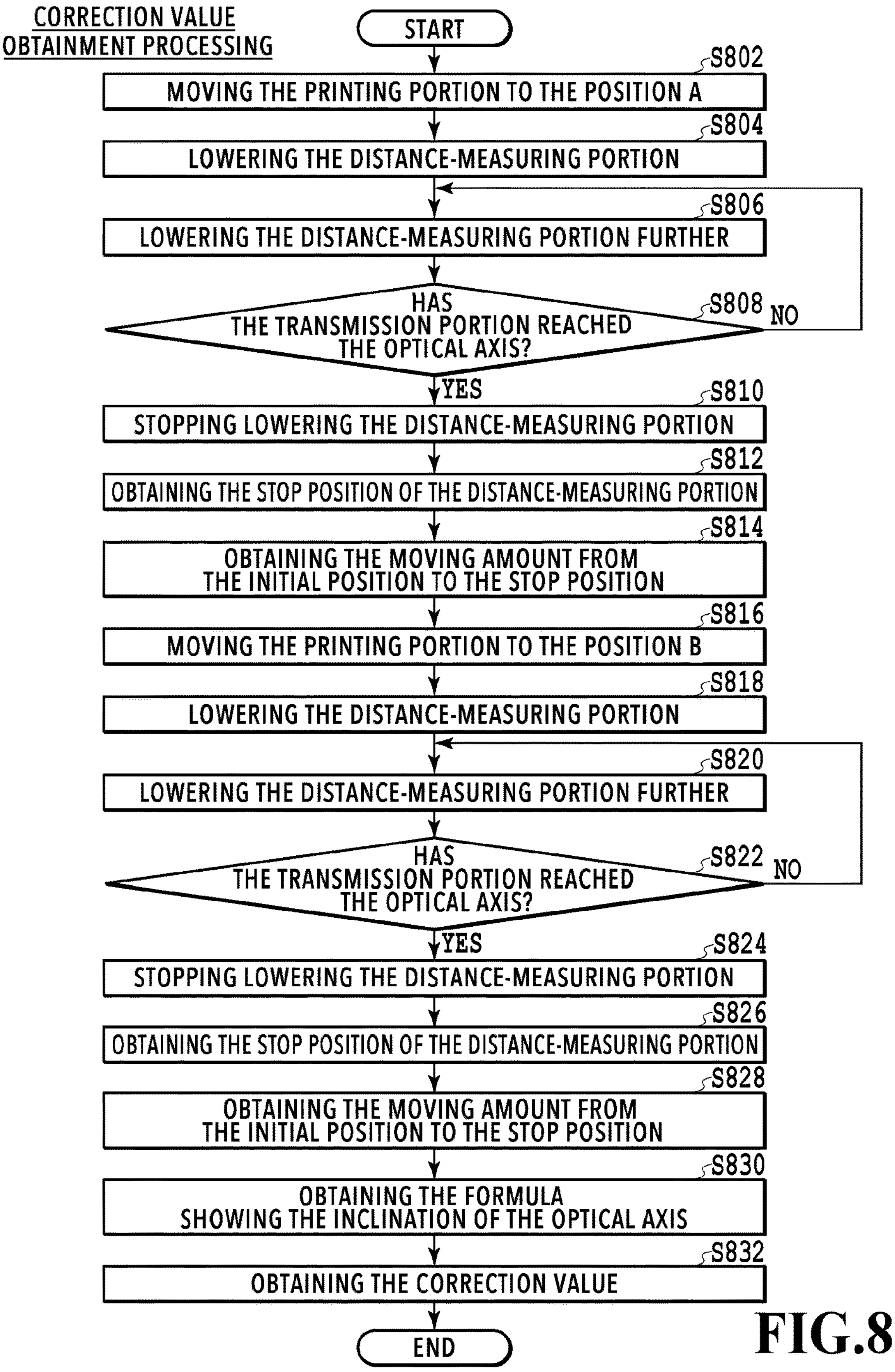
FIG. 8 is a flowchart illustrating a detailed processing routine of correction value obtainment processing.
Figure 9A:
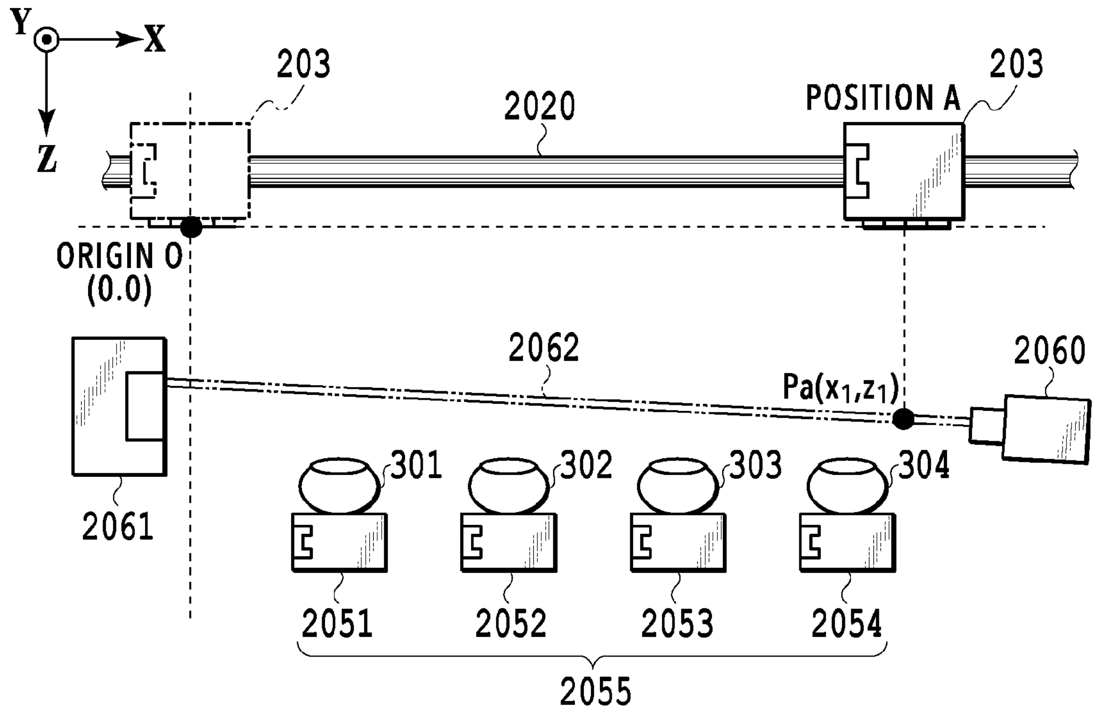
FIG. 9A and FIG. 9B are diagrams for explaining a method of obtaining inclination of the optical axis.
Figure 9B:
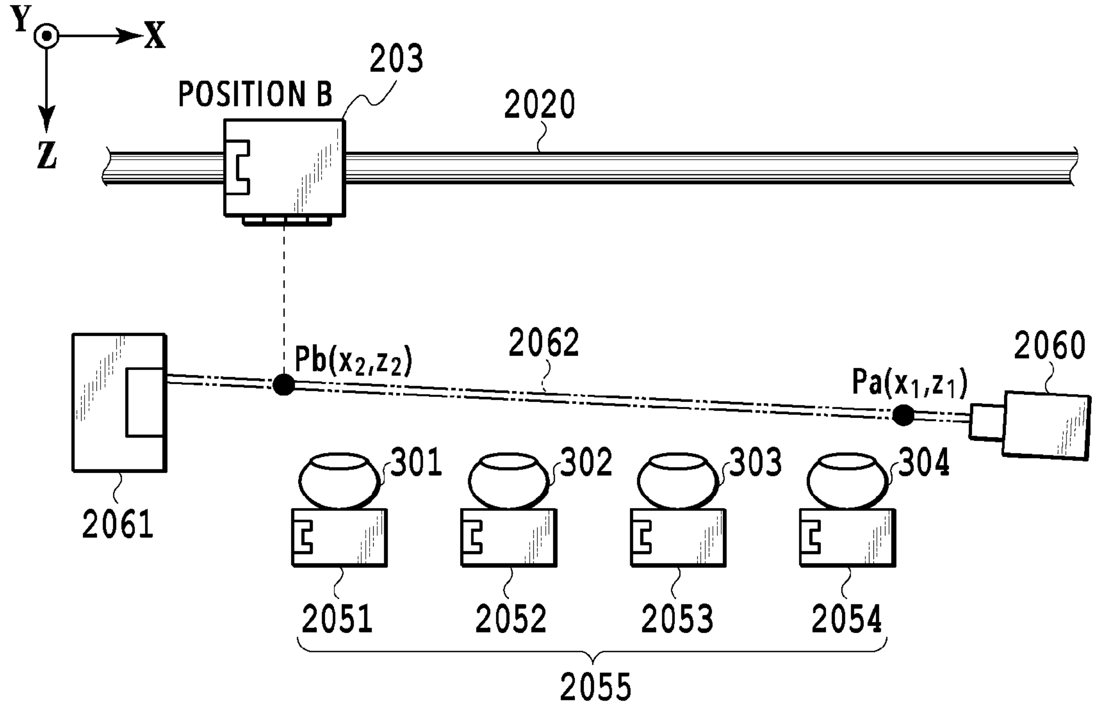
Figure 10A:
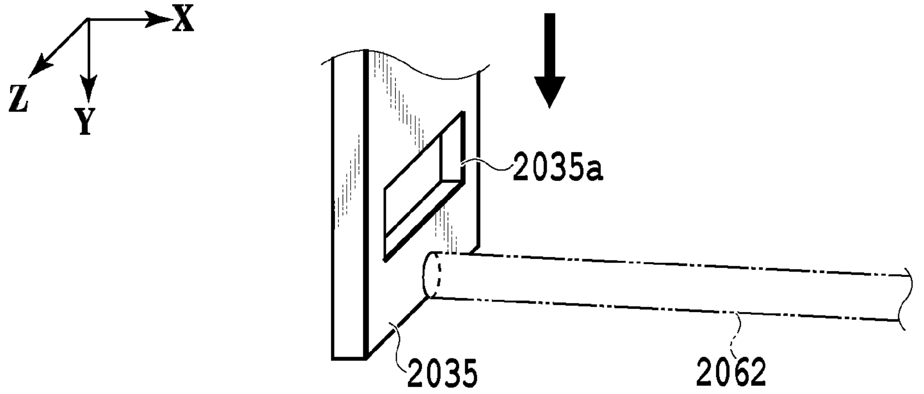
FIG. 10A and FIG. 10B are diagrams illustrating a position of the optical axis relative to the distance-measuring portion in a case where the distance-measuring portion is lowered.
Figure 10B:
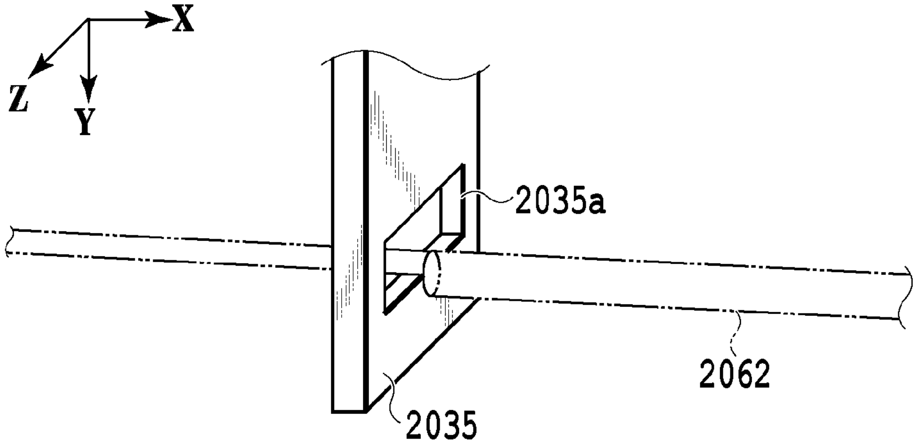

In the nail printing apparatus 20, if an instruction for obtaining a correction value is input by an operator or a user at a predetermined timing, such as at the time of shipment from the factory or at the time of replacement of the print head 2030, the correction value obtainment processing is started. FIG. 8 is a flowchart illustrating a detailed processing routine of the correction value obtainment processing. FIG. 9A and FIG. 9B are diagrams for explaining positions for measuring the distance between the printing portion and the optical axis. FIG. 10A and FIG. 10B are diagrams illustrating the positional relationship between the distance-measuring portion and the optical axis at the time of measuring the distance from the printing portion to the optical axis. The series of these processes illustrated in the flowchart of FIG. 8 is performed by the CPU 1011 loading a program code stored in the ROM 1013 into the RAM 1012 and executing the program code. Alternatively, a part or all of the functions in the steps of FIG. 8 may be executed by hardware such as an ASIC or an electronic circuit. Note that the sign "S" in the explanation of each process means that it is a step of the flowchart. Hereinafter, the same applies to the present specification.

If the correction value obtainment processing is started, the CPU 1011 first moves the printing portion 203 to the position A (see FIG. 9A) which is in the vicinity of one end part in the X direction (S802). Then, the CPU 1011 lowers the distance-measuring portion 2035, which is installed on the print head 2030, from the initial position to a position where the laser beam is blocked, that is, where the distance-measuring portion 2035 overlaps the optical axis 2062 (S804). Specifically, at the position in S804, the optical axis 2062 overlaps the vicinity of the lower end part of the distance-measuring portion 2035 as in FIG. 10A. Further, the initial position is a position corresponding to the plane of the printing portion 203 on which the nozzle arrays are formed.

Next, the CPU 1011 further lowers the distance-measuring portion 2035 (S806) and determines whether or not the transmission portion 2035*a* has reached the optical axis 2062 (S808). In S808, the distance-measuring portion 2035 determines whether or not the transmission portion 2035*a* has reached the position where 50% of the diameter of the laser beam is transmitted (see FIG. 10B). Note that such a determination is made based on the amount of light received by the light receiving portion 2061. Specifically, if the amount of received light becomes half of when 100% of the laser light is received, the distance-measuring portion 2035 determines that the transmission portion 2035*a* has reached the position where 50% of the diameter of the laser beam is transmitted.

If it is determined in S808 that the transmission portion 2035*a* has not reached the optical axis 2062, the processing returns to S806. Further, if it is determined in S808 that the transmission portion 2035*a* has reached the optical axis 2062, the CPU 1011 stops lowering the distance-measuring portion 2035 (S810) and obtains the stop position of the distance-measuring portion 2035 (S812). Then, the CPU 1011 obtains the moving amount of the distance-measuring portion 2035 at the position A from the initial position to the stop position (S814). This moving amount, which is a result of the measurement by the distance-measuring portion 2035, is the distance from the printing portion 203 to the optical axis 2062 at the position A. In S814, the obtained moving amount is held in the measured-distance-holding portion 1022 of the ROM 1013.

If the measurement of the distance between the printing portion 203 and the optical axis 2062 at the position A is completed, the CPU 1011 then moves the printing portion 203 to the position B, which is in the vicinity of the other end part in the X direction (S816). It is sufficient as long as the position A and the position B are different positions in the X direction. Then, the CPU 1011 lowers the distance-measuring portion 2035 from the initial position to a position where the laser beam is blocked (S818). Next, the CPU 1011 further lowers the distance-measuring portion 2035 (S820) and determines whether or not the transmission portion 2035*a* has reached the optical axis 2062 (S822). If it is determined in S822 that the transmission portion 2035*a* has not reached the optical axis 2062, the processing returns to S822. Further, if it is determined in S822 that the transmission portion 2035*a* has reached the optical axis 2062, the CPU 1011 stops lowering the distance-measuring portion 2035 (S824) and obtains the stop position of the distance-measuring portion 2035 (S826). Then, the CPU 1011 obtains the moving amount of the distance-measuring portion 2035 at the position B from the initial position to the stop position (S828). Note that, since the specific details of processing of S818 to S828 are the same as those of S804 to S814 described above, the detailed explanations thereof will be omitted.

Thereafter, the CPU 1011 obtains a formula showing the inclination of the optical axis 2062 in the Z direction (S830). In S830, first, the coordinate value (x1, z1) of the point Pa on the optical axis 2062 at the position A and the coordinate value (x2, z2) of the point Pb on the optical axis 2062 at the position B are obtained (see FIG. 9A). Here, the origin O(x, z)=(0,0) is based on the other end part of the printing portion 203 with respect to the X direction and based on the plane of the printing portion 203 on which the nozzle arrays are formed with respect to the Z direction. The X coordinate values can be obtained based on the moving amounts of the printing portion 203 from the origin O to the position A and the position B. Further, the Z coordinate values can be obtained based on the moving amount obtained in S814 and the moving amount obtained in S828.

Next, the coordinate values of the points Pa and Pb are substituted into the equation of a straight line shown in the following formula (1), so as to obtain a formula showing the inclination of the optical axis 2062.

$$z-z1=\{(z2-z1)/(x1-x2)\}*(x-x1) \quad (1)$$

Next, the correction value for correcting the deviation from the position suitable for printing on the nail portion, which is caused by the inclination of the optical axis 2062, is obtained (S832). Then, this correction value obtainment processing ends. In S832, first, the distance between the optical axis 2062 and the printing portion 203 at the position in the X direction corresponding to each finger raise/lower portion 2055 is obtained from the formula that is obtained in S830. Note that the position (X coordinate value) in the X direction corresponding to each finger raise/lower portion 2055 is already-known information. Next, the difference between the obtained distance and the preset distance between the nail portion and the printing portion 203 suitable for printing is obtained as the correction value.

Figure 11A:
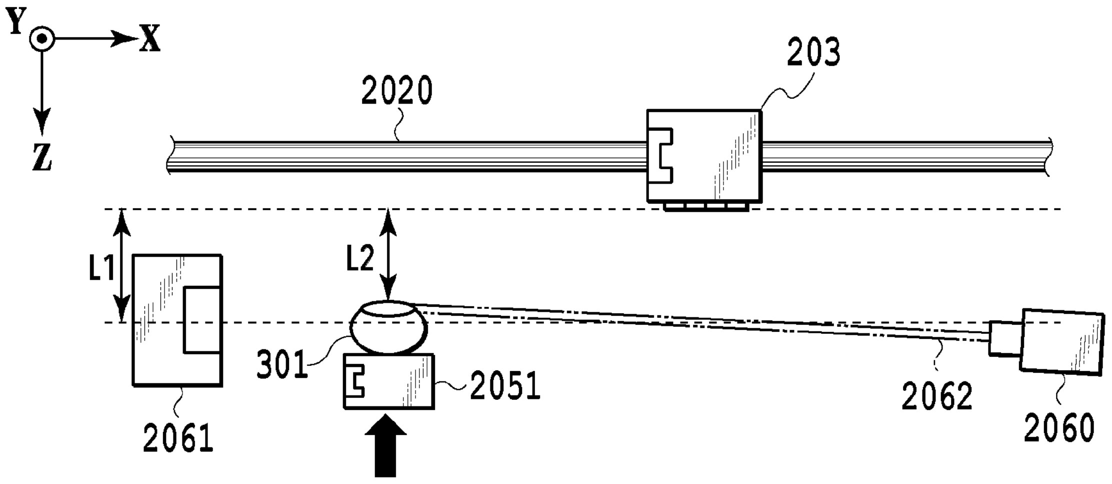
FIG. 11A and FIG. 11B are diagrams illustrating a distance between a printing portion and a nail portion in relation to inclination of the optical axis.
Figure 11B:
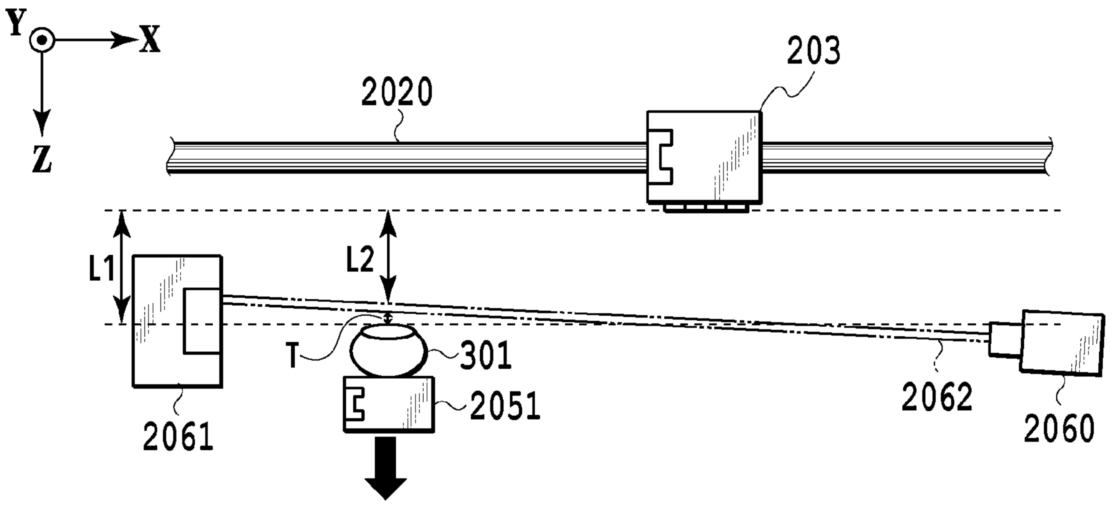

Here, with reference to FIG. 9A and FIG. 9B and FIG. 11A and FIG. 11B, the processing of obtaining the formula showing the inclination of S830 and the processing of obtaining the correction value of S832 will be specifically explained. FIG. 11A and FIG. 11B are diagrams for specifically explaining obtainment of the correction value. In the example of FIG. 11A and FIG. 11B, the distance between the nail portion and the printing portion 203 suitable for printing is shown as L1, and the distance between the optical axis 2062 and the printing portion 203 is shown as L2.

Here, it is assumed that the coordinate value of the point Pa is (x1, z1)=(200, −2.5) and the coordinate value of the point Pb is (x2, z2)=(50, −1.5). In this case, from the above formula (1), the formula obtained in S5830 will be the following formula (2).

$$z=-1/150*x-7/6 \quad (2)$$

Next, the correction value is obtained from the formula showing the inclination of the optical axis 2062, which is obtained as described above. In the following explanation, the case of obtaining the correction value for the finger raise/lower portion 2051 will be explained. In a case where the position in the X direction of the index finger 301 placed on the finger raise/lowerportion 2051 is 100 mm from the origin, if 100 is substituted for "x" in the above formula (2), z=−1.833 . . . is obtained. This indicates that the distance L2 from the nail portion to the printing portion 203 in a case where the finger raise/lower portion 2051 is raised until the nail portion of the index finger 301 reaches the optical axis 2062 is 1.83. If the distance L1 is 2.00 mm, the position of the nail portion of the index finger has the deviation T upward by 0.17 mm, and thus the correction value for correcting this deviation T is stored in a storage area such as the ROM 1013. The above-mentioned correction value is 0.17 mm downward, e.g., —0.17 mm, and the finger raise/lower portion 2051 is associated with this value.

In this way, in the present embodiment, the CPU 1011 functions as an obtaining portion that obtains a correction value for correcting the deviation of the nail portion from the position suitable for printing with the printing portion 203, which is caused by the inclination of the optical axis 2062.

<Nail Printing Processing>

If an instruction for starting the nail printing processing in which printing on a nail portion is performed is provided in a state where the correction value is obtained by the correction value obtainment processing as described above, the nail printing apparatus 20 executes the nail printing processing. Note that, in the following explanation, it is assumed that, in a case where the nail printing processing is started, a hand has already been placed on the hand placement portion 205 and the nail portion of each finger has already been at a position where printing can be performed by the printing portion 203. Further, as for the laser portion 206, it is assumed that the laser light is emitted from the light emitting portion 2060.

Figure 12:
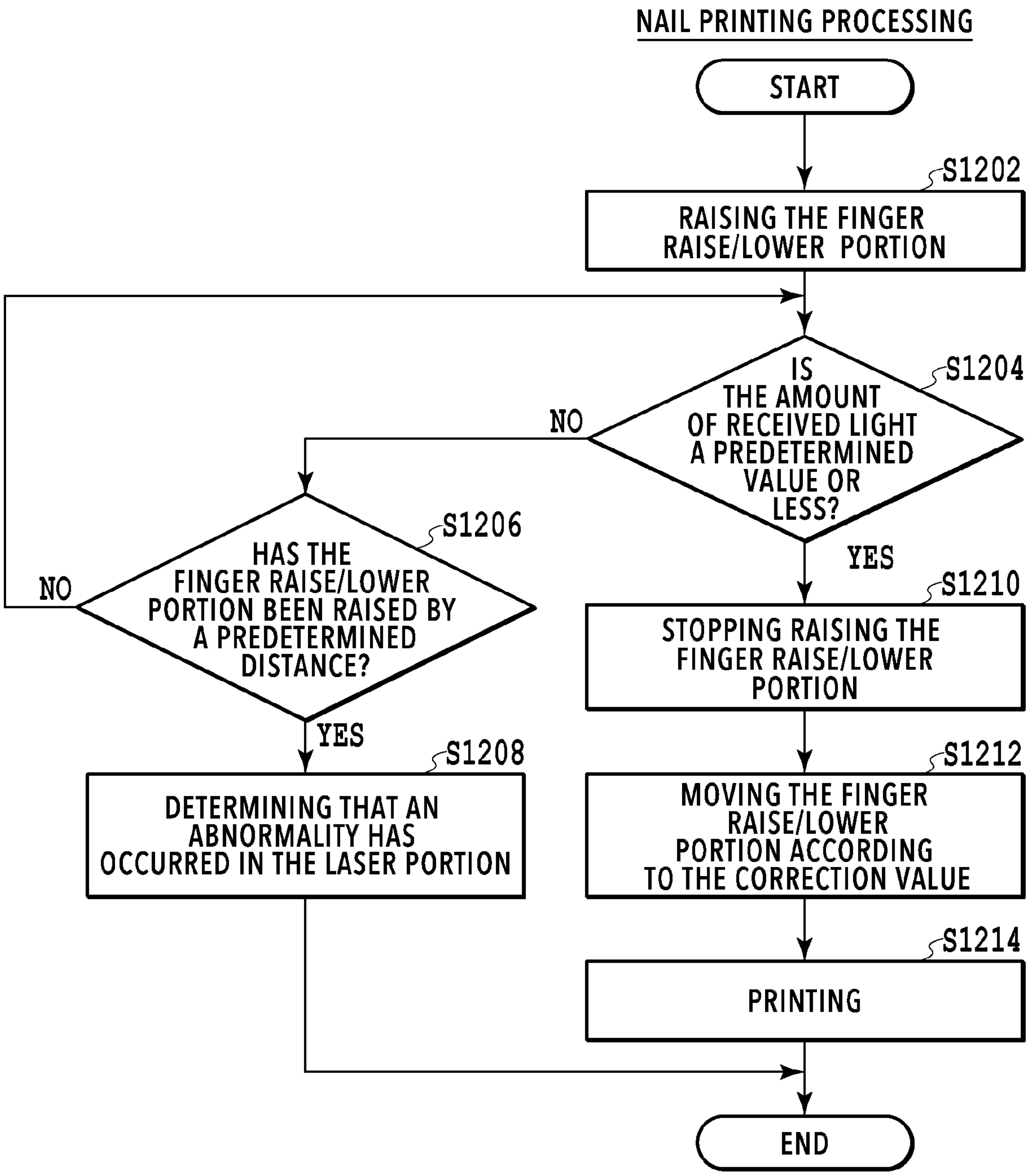
FIG. 12 is a flowchart illustrating a detailed processing routine of nail printing processing.

FIG. 12 is a flowchart illustrating a detailed processing routine of nail printing processing. The series of these processes illustrated in the flowchart of FIG. 12 is performed by the CPU 1011 loading a program code stored in the ROM 1013 into the RAM 1012 and executing the program code. Alternatively, a part or all of the functions in the steps of FIG. 12 may be executed by hardware such as an ASIC or an electronic circuit.

If the nail printing processing is started, the CPU 1011 first raises the finger on which the nail portion to be the printing target is formed by use of the finger raise/lower portion 2055 (S1202). Then, the CPU 1011 monitors the amount of received light in the laser portion 206 and determines whether or not the amount of received light has decreased to a predetermined value or less (S1204). By continuing raising the finger raise/lower portion 2055, the nail portion of the finger placed on the finger raise/lower portion 2055 reaches the optical axis 2062 and blocks the laser light, so that the amount of received light in the laser portion 206 becomes the predetermined value or less.

In S1204, if it is determined that the amount of received light has not decreased to the predetermined value or less, the CPU 1011 determines whether or not the finger raise/lower portion 2055 has been raised by a predetermined distance (S1206), and, if it is determined that the finger raise/lower portion 2055 has not been raised by the predetermined distance, the processing returns to S1204. If it is determined in S1206 that the finger raise/lower portion 2055 has been raised by the predetermined distance, it is determined that an abnormality has occurred in the laser portion 206 (S1208), and thus a notification of the abnormality is provided, and the nail printing processing ends. For example, the above-mentioned predetermined distance is a distance that is shorter by a certain amount than a distance at which the finger placed on the finger raise/lower portion 2055 may make contact with a configuration of the nail printing apparatus 20.

Further, in S1204, if it is determined that the amount of received light has decreased to the predetermined value or less, it is determined that the nail portion of the finger has reached the height of the optical axis 2062, so that the raising of the finger raise/lower portion 2055 is stopped (S1210). Then, the correction value stored in association with the raised finger raise/lower portion 2055 is obtained, and the finger raise/lower portion 2055 is moved based on this correction value (S1212). In S1212, if the correction value is Q mm upward (+Q mm), the finger raise/lower portion 2055 is raised by Q mm, and, if the correction value is R mm downward (—R mm), the finger raise/lower portion 2055 is lowered by R mm. Accordingly, the nail portion of the finger placed on the finger raise/lower portion 2055 is located at a position away from the printing portion 203 by the distance suitable for printing.

Thereafter, the CPU 1011 performs printing on the nail portion whose distance from the printing portion 203 is exactly the distance suitable for printing (S1214), and, if the printing ends, the nail printing processing ends.

In this way, in the present embodiment, the CPU 1011 functions as a print-controlling portion that detects a nail portion by use of the laser portion 206, moves the nail portion to a position suitable for printing with the printing portion 203 to perform printing, and adjusts a condition for printing, based on a correction value.

As explained above, the nail printing apparatus 20 according to the present embodiment uses the distance-measuring portion for the laser beam located at the position suitable for printing in the Z direction, in order to obtain the coordinate values of the two points on the optical axis of the laser beam and obtain the inclination of the optical axis. Further, based on the obtained inclination, the correction value for correcting the deviation of the position suitable for printing on the nail portion, which is caused by the inclination of the optical axis, is calculated. Furthermore, based on the obtained correction value, the finger raise/lower portion for raising the nail portion is raised or lowered.

Accordingly, in the nail printing apparatus 20 according to the present embodiment, the nail portion to be the printing target can be accurately moved to the position suitable for printing with the printing portion, so that deterioration in the printing quality can be suppressed.

Other Embodiments

Note that the above-described embodiment may be modified as shown in the following (1) through (5).

(1) Although not particularly described in the above embodiment, it is also possible that the correction value obtainment processing is executed only at the time of shipment from the factory. In this case, the nail printing apparatus 20 is shipped in a state where the obtained correction value is stored in a storage area such as the ROM 1013, and, at the time of printing on a nail portion, the finger raise/lower portion 2055 is controlled based on the stored correction value, so as to adjust the position of the nail portion. Further, in this case, for example, the distance-measuring portion 2035 is configured to be detachable from the carriage 2031 on which the print head 2030 is not mounted, and, as with the above-described embodiment, the initial position is the position corresponding to the plane of the print head 2030 on which the nozzle arrays are formed.

Further, such a correction value is not limited to one that is obtained by use of the distance-measuring portion 2035 and may be obtained by various publicly-known techniques. Therefore, in this case, the nail printing apparatus 20 adjusts a condition for printing on the nail portion with the printing portion 203 by, for example, obtaining the correction value obtained in advance and adjusting the relative position between the nail portion and the printing portion 203 at the time of printing, based on this correction value.

(2) Although the printing portion 203 and the laser portion 206 are configured to be movable in the X direction and the Y direction and the finger raise/lower portion 2055 is configured to be movable in the Z direction in the above embodiment, there is not a limitation as such. For example, it is also possible that the printing portion 203 (the print head 2030) and the laser portion 206 are configured to be movable in the X direction, the Y direction, and the Z direction. In this case, if the condition for printing is adjusted based on the correction value, it is also possible that the printing portion 203 moves in the Z direction so that the nail portion is located at the position suitable for printing with the printing portion 203. Further, although the coordinate values of the two points on the optical axis 2062 are obtained at the time of obtaining the inclination of the optical axis in the above-described embodiment, there is not a limitation as such. That is, for example, if the coordinate value of the emission port of the laser beam of the light emitting portion 2060 is obtained in advance, it is only required to obtain the coordinate value of one point on the optical axis 2062, so that the correction value can be obtained based on the obtained coordinate value and the coordinate value of the emission port.

(3) Although not particularly described in the above embodiment, it is also possible that the ejection timing is set according to the obtained correction value, so that ink is controlled to be ejected from the nozzle arrays according to the ejection timing at the time of printing on the nail portion. For example, a table in which the first ejection timing is associated with the correction value that is more than 0 mm and less than 0.5 mm and the second ejection timing is associated with the correction value that is 0.5 mm or more and less than 1.0 mm is prepared. Then, at the time of printing on the nail portion, printing is performed by controlling ink ejection at the associated ejection timing, based on the correction value. As the distance from the nail portion placed on the finger raise/lower portion 2055 to the printing portion 203 is further, the ejection of ink to the desired position for printing needs to be performed at a position further in the X direction. In the above-described example, the ejection timing is set so that the distance in the X direction between the ejection-starting position of the ejection performed at the first ejection timing and the desired position for printing is longer than the distance in the X direction between the ejection-starting position of the ejection performed at the second timing and the desired position for printing. In this case, the process corresponding to the distance adjustment between the printing portion 203 and the nail portion can be executed by controlling the ink ejection from the printing portion 203 without physical movement.

(4) Although the nail printing apparatus that performs printing by the inkjet system is taken as an example for the explanation in the above-described embodiment, the application to the present invention is not limited to the example. The above-described embodiment can be applied to various printing apparatuses that are capable of adjusting the position of the printing medium relative to the printing portion. Further, the printing system is not limited to the inkjet system, and it is possible to apply various printing systems that perform printing at a predetermined distance from the printing target.

(5) The above-described embodiment and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-053232, filed Mar. 26, 2021, which is hereby incorporated by reference herein in its entirety.

What is claimed is:

1. A nail printing apparatus comprising:

a printing unit configured to be capable of performing printing on a nail portion to be a printing target while relatively changing its position from the nail portion in a first direction;

a placement unit on which a finger, which includes the nail portion, is placed along a second direction that intersects the first direction;

a detecting unit configured to detect the nail portion by use of a light whose distance from the printing unit in a third direction, which intersects the first direction and the second direction, is maintained to a predetermined distance;

a print-controlling unit configured to cause the detecting unit to detect the nail portion of the finger placed on the placement unit by changing a relative position of the placement unit from the light and cause the printing unit to perform printing on the nail portion by changing relative positions of the printing unit and the placement unit so that the nail portion is located away from the printing unit in the third direction by the predetermined distance, based on a result of the detection; and an obtaining unit configured to obtain a correction value for correcting deviation of the nail portion from a position corresponding to the predetermined distance to the printing unit in the third direction, the deviation being caused by inclination of an optical axis of the light, wherein, based on the correction value, the print-controlling unit adjusts a condition for printing on the nail portion with the printing unit to perform printing.

2. The nail printing apparatus according to claim 1, wherein, based on the correction value, the print-controlling unit adjusts relative positions of the printing unit and the nail portion as the condition for printing.

3. The nail printing apparatus according to claim 1, wherein the printing unit performs printing by ejecting ink, and wherein, as the condition for printing, the print-controlling unit adjusts a timing of ejection with the printing unit onto the nail portion, based on the correction value.

4. The nail printing apparatus according to claim 1, further comprising a measuring unit configured to be capable of moving from the printing unit in the third direction and capable of measuring a distance between the printing unit and the optical axis in the third direction, wherein the obtaining unit obtains the correction value, based on the distance measured by the measuring unit.

5. The nail printing apparatus according to claim 4, wherein, by measuring distances between the printing unit and the optical axis at different two points on the optical axis with the measuring unit, the obtaining unit obtains the inclination of the optical axis based on a result of the measurement, obtains a distance from a position of the nail portion in the first direction to the optical axis, based on the inclination, and obtains a difference between the obtained distance and the predetermined distance as the correction value.

6. The nail printing apparatus according to claim 4, wherein the measuring unit includes a transmission portion that is formed of a material that blocks the light and capable of transmitting the light at a predetermined position in the third direction and is lowered from an initial position in order to measure a length to a position at which the optical axis reaches the transmission portion.

7. The nail printing apparatus according to claim 4, wherein the measuring unit is detachable from the printing unit.

8. The nail printing apparatus according to claim 1, wherein the predetermined distance corresponds to a distance suitable for printing on the nail portion performed by the printing unit.

9. The nail printing apparatus according to claim 1, wherein the light is a laser light.

10. The nail printing apparatus according to claim 2, wherein the printing unit is configured to be movable in the first direction and the second direction, wherein the placement unit is configured to be movable in the third direction, and wherein the print-controlling unit adjusts a position of the placement unit in the third direction for adjusting the condition for printing.

11. The nail printing apparatus according to claim 2, wherein the printing unit is configured to be movable in the first direction, the second direction, and the third direction, and wherein the print-controlling unit adjusts a position of the printing unit in the third direction for adjusting the condition for printing.

12. A nail printing method for a nail printing apparatus including a printing unit configured to be capable of performing printing on a nail portion to be a printing target while relatively changing its position from the nail portion in a first direction, a placement unit on which a finger, which includes the nail portion, is placed along a second direction that intersects the first direction, and a detecting unit configured to detect the nail portion by use of a light whose distance from the printing unit in a third direction, which intersects the first direction and the second direction, is maintained to a predetermined distance, the nail printing method comprising:

a detecting step for causing the detecting unit to detect the nail portion of the finger placed on the placement unit by changing a relative position of the placement unit from the light;

an obtaining step for obtaining a correction value for correcting deviation of the nail portion from a position corresponding to the predetermined distance to the printing unit in the third direction, the deviation being caused by inclination of an optical axis of the light; and a printing step for causing the printing unit to perform printing on the nail portion by changing relative positions of the printing unit and the placement unit so that the nail portion is located away from the printing unit in the third direction by the predetermined distance and by adjusting a condition for printing on the nail portion with the printing unit, based on the correction value.

13. A printing apparatus comprising:

a printing unit configured to be capable of performing printing on a printing target while relatively changing its position from the printing target in a first direction;

a detecting unit configured to be capable of detecting the printing target by use of a light whose distance from the printing unit in a second direction, which intersects the first direction, is maintained to a predetermined distance;

a print-controlling unit configured to cause the detecting unit to detect the printing target by changing a relative position of the printing target from the light and cause the printing unit to perform printing on the printing target by changing relative positions of the printing unit and the printing target so that the printing target is located away from the printing unit in the second direction by the predetermined distance, based on a result of the detection; and an obtaining unit configured to obtain a correction value for correcting deviation of the printing target from a position corresponding to the predetermined distance to the printing unit in the second direction, the deviation being caused by inclination of an optical axis of the light, wherein, based on the correction value, the print-controlling unit adjusts a condition for printing on the printing target with the printing unit to perform printing.

14. The printing apparatus according to claim 13, wherein, based on the correction value, the print-controlling unit adjusts relative positions of the printing unit and the printing target as the condition for printing.

15. The printing apparatus according to claim 13, wherein the printing unit performs printing by ejecting ink, and wherein, as the condition for printing, the print-controlling unit adjusts a timing of ejection with the printing unit onto the printing target, based on the correction value.

16. The printing apparatus according to claim 13, further comprising a measuring unit configured to be capable of moving from the printing unit in the second direction and capable of measuring a distance between the printing unit and the optical axis in the second direction, wherein the obtaining unit obtains the correction value, based on the distance measured by the measuring unit.

17. The printing apparatus according to claim 16, wherein, by measuring distances between the printing unit and the optical axis at different two points on the optical axis with the measuring unit, the obtaining unit obtains the inclination of the optical axis based on a result of the measurement, obtains a distance from a position of the printing target in the first direction to the optical axis, based on the inclination, and obtains a difference between the obtained distance and the predetermined distance as the correction value.

18. The printing apparatus according to claim 16, wherein the measuring unit includes a transmission portion that is formed of a material that blocks the light and capable of transmitting the light at a predetermined position in the second direction and is lowered from an initial position in order to measure a length to a position at which the optical axis reaches the transmission portion.

19. The printing apparatus according to claim 16, wherein the measuring unit is detachable from the printing unit.

20. The printing apparatus according to claim 13, wherein the predetermined distance corresponds to a distance suitable for printing on the printing target performed by the printing unit.

* * * * *